United States Patent [19]
Cowpertwait

[11] 4,152,029
[45] May 1, 1979

[54] FLUENT SOLID MATERIAL HANDLING MEANS

[75] Inventor: John Cowpertwait, Biggin Hill, England

[73] Assignee: Babcock Hydro-Pneumatics Limited, London, England

[21] Appl. No.: 838,260

[22] Filed: Sep. 30, 1977

[30] Foreign Application Priority Data

Oct. 1, 1976 [GB] United Kingdom ............... 40751/76

[51] Int. Cl.² ............................................. B65G 53/12
[52] U.S. Cl. ...................................... 406/38; 406/56; 406/116; 406/120; 414/145
[58] Field of Search .................. 302/11, 27, 36, 39, 302/42, 50, 53, 57, 34, 1; 214/14, 15 R, 15 D, 15 E, 17 D; 198/558, 670, 511, 518, 519

[56] References Cited

U.S. PATENT DOCUMENTS

| | | | |
|---|---|---|---|
| 590,084 | 9/1897 | Blanchard | 302/39 X |
| 1,584,442 | 5/1926 | Every | 214/15 E |
| 1,971,425 | 8/1934 | Morrow | 302/17 |
| 2,558,006 | 6/1951 | Shriver et al. | 198/670 X |

FOREIGN PATENT DOCUMENTS 326117  2/1972  U.S.S.R. ................................. 302/42

Primary Examiner—Robert B. Reeves
Assistant Examiner—James L. Rowland
Attorney, Agent, or Firm—Kemon & Estabrook

[57] ABSTRACT

A mobile bulk material unloader for a bulk carrier or general cargo ship including a mechanical elevator associated with a pneumatic system which can be suspended from a derrick and lowered into the hold of a bulk carrier such that the inlet means is in connection with the material to be transported. The combining of a mechanical elevator and a pneumatic system have resulted in a compact, portable unloader which substantially reduces the quantity of dust produced during transportation and which avoids the necessity of providing special bases in the holds of bulk carriers or the provision of expensive and complex bulk unloading structures located on the quay.

12 Claims, 6 Drawing Figures

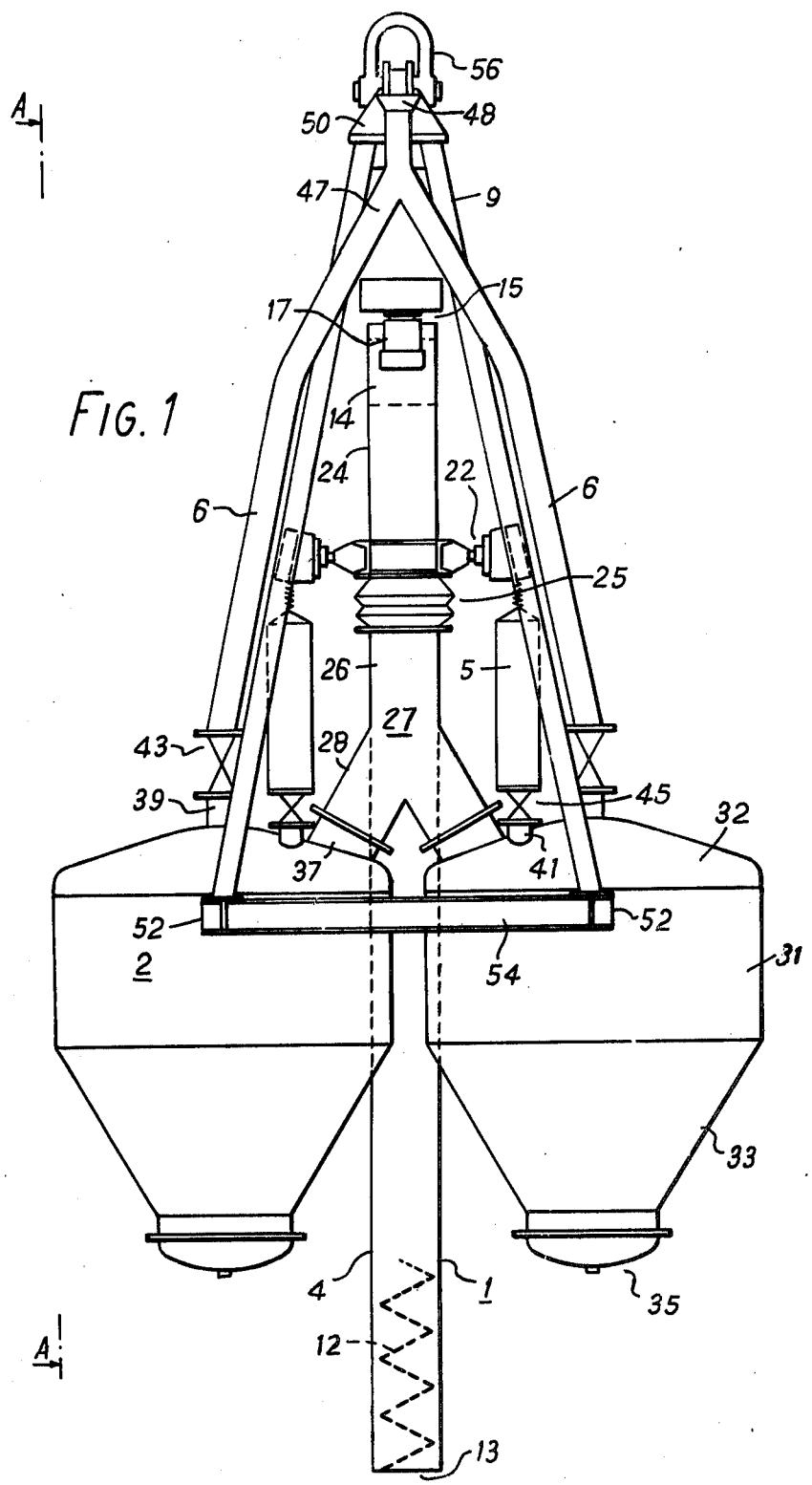

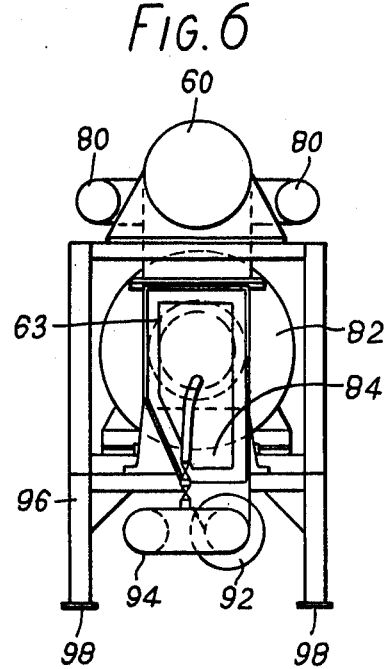
FIG. 6
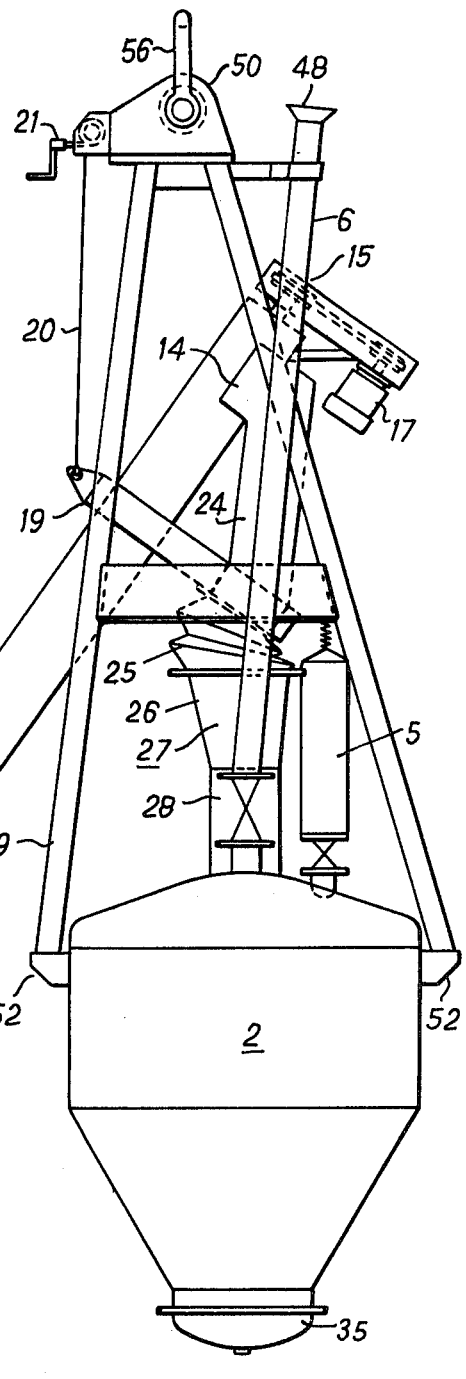
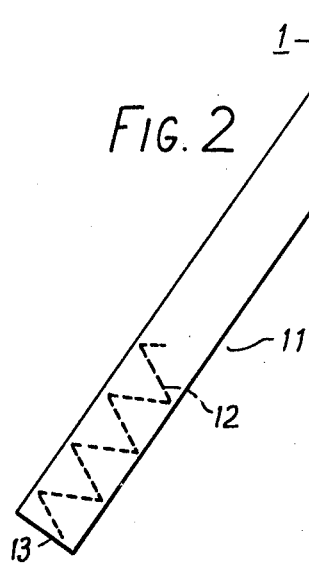
FIG. 2

FLUENT SOLID MATERIAL HANDLING MEANS

This invention relates to a mobile bulk unloader for unloading granular or pulverulent material from a bulk carrier or general cargo ship.

When a ship has its holds loose-loaded with finely divided fluent solids there are certain problems associated with unloading the holds. Traditional mechanised methods have involved using a crane supported grab, or pneumatic systems involving blowing the material from fluidized state holds, or pneumatic systems involving vacuum pipe suction, or fixed installation elevator systems. All of these methods have their uses and are widely adopted but also have disadvantages. For example, with crane supported mechanical grabs it is necessary to have heavy duty cranes mounted at the quay sides to lift out large batches per grab (or the process is too slow using small grabs), the grabs then have to be winched up and swung over and dropped into the new land based receptacle and this invariably takes time and creates dust problems. With pneumatic systems from fluidized state holds it is necessary to specifically design or modify the ship's holds to install air pumps and perforated base plates in order to bring about the fluidized state, and that limits the use of the system to certain expensive modified bulk carriers. With vacuum pipe suction it will be appreciated that the maximum pressure differential possible is one atmosphere (i.e., zero pressure within the suction pipe assisted by air pressure in the hold) which limits the lifting ability, and furthermore quite an extensive quayside plant is needed to generate the vacuum and also to separate the sucked up material from the entrained air. With purely mechanical elevator systems there is a need for a large and rigidly mounted shore based unit on which the mechanical elevator means is mounted and from which it is powered, which necessitates heavy expenditure in fixed installations and limits the ships to certain docking areas.

The apparatus of the present invention gives a system which is particularly suited to the use of ordinary (i.e., not specially modified) bulk carriers and which can be used by quays and shores not furnished with expensive fixed installation plant. For example, the system can be used to unload cement in bulk during relatively short duration large scale civil engineering and construction projects. Further advantages will become apparent once the equipment has been described.

The invention provides a mobile bulk unloader for removing finely divided solid fluent material from a hold of a bulk carrier, adapted to be suspended from a suspension unit positionable above the hold, and movable within the hold, including a mechanical elevator system continuously operable to pick-up, convey upwardly and deliver the material to a feed means feeding into an apparatus for initiating pneumatic transport of the material under superatmospheric air pressure and connectable to a discharge pipe for conveying the solid fluent material away from the hold entrained in a stream of pressurized air.

Conveniently, the mechanical elevator system includes a screw conveyor contained within a tubular conduit, which in some embodiments can be arranged to be pivotable with respect to the apparatus for initiating pneumatic transport.

Suitably, the apparatus for initiating pneumatic transport of the material may operate on an intermittent basis and include a blow tank having a valved inlet for solid material from the feed means, a valved inlet for pressurized air, and a valved outlet for the material entrained in a stream of pressurized air, or may operate on a continuous basis and include a fluid solids pump having an impeller screw within a barrel for leading solid fluent material into an air/solid mixing chamber provided with a pressurized air inlet, and connectable to the discharge pipe.

Most conveniently the feed means between the mechanical elevator system and the apparatus for initiating pneumatic transport of the material is a gravity feed, which optionally may include means for air assisting the downward passage of material.

The invention will now be described by way of examples with reference to the accompanying partly diagrammatic drawings in which:

FIG. 1 is a side view of a first embodiment of the invention wherein the mechanical elevator system is a screw conveyor contained within a tubular conduit and the apparatus for initiating pneumatic transport includes a pair of blow tanks;

FIG. 2 is a side view on line A—A of FIG. 1 but showing the screw conveyor pivoted outwardly from the vertical position shown in FIG. 1;

FIG. 4 is drawn to a larger scale than FIGS. 1 to 3;

FIG. 5 is a side view on line D—D of FIG. 4; and

FIG. 6 is a section view taken on composite line C—C.

Figure 3:
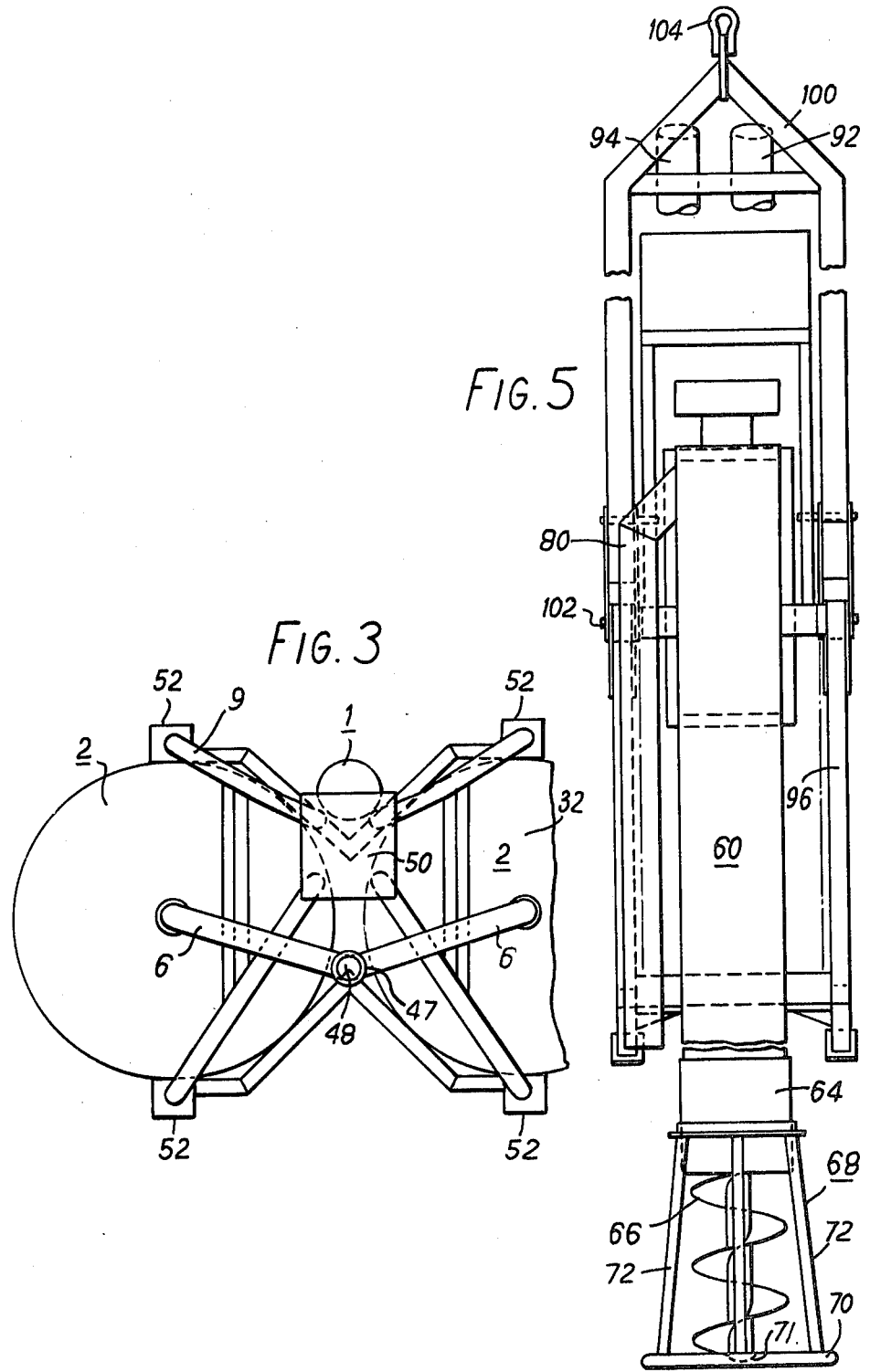
FIG. 3 is a plan view of FIG. 1.

Referring now to FIGS. 1 to 3, the first embodiment of the bulk unloader comprises, in general terms, a maneuverable screw conveyor 1 feeding a pair of valved pressure blow tanks 2, each having associated air filtering equipment 5 and material discharge pipes 6, together with associated drive means and control equipment, all carried on a support frame 9 which can be suspended from a bulk carrier's deck derrick.

The whole apparatus measures, very approximately, 23 ft (700 cm) in height by 6 ft (185 cm) in depth and 10 ft (300 cm) in length, as shown in FIG. 1 when the screw conveyor is positioned vertically.

The mechanical elevator for initially picking up and lifting the material is a screw conveyor in the form of a straight hollow tube 11 about 1 ft (30 cm) in diameter and about 16 ft (480 cm) in length containing an axially mounted screw 12 running the length of it and sweeping the whole internal volume. The bottom of the tube 13 is open so that the blade of the screw is exposed enabling it to initially pick up the pulverulent material. At the top of the conveyor is a material discharge outlet 14 from the side of the tube. The top end of the tube carries appropriate journals and bearings 15 for the screw. Beyond the bearings is a screw driving means 17 in the form of a variable speed drive unit, which enables the screw output to be tuned to match the input and output capabilities of the pressure tanks.

The screw conveyor 1 is mounted so that it may be pivoted about its upper end with respect to the framework 9 carrying the whole unloader. Thus, at about 3 ft (90 cm) from the top end of the conveyor is a mounting bracket 19 on the conveyor tube, connected at one side by a cable 20 to a hand or mechanically operated winch 21 mounted on the framework above the said mounting bracket 19. The outer side of the conveyor mounting bracket is connected via a mechanical linkage to a pivot bearing unit 22 on the framework, thereby producing a lever system with the fulcrum at one end and the moving force transmitted by the winch to the other end, with the load to be moved, the conveyor, intermediate the ends. This system gives the conveyor a degree of maneuverability with respect to the rest of the unloader and enables the screw conveyor to be swivelled or swung out from a vertical position to an angle of about 45° to the vertical, as shown in FIG. 2.

The material discharge outlet from the screw conveyor takes the form of a downwardly sloping tube 24 of about 1 ft (30 cm) diameter rigidly mounted onto the conveyor tube at an angle of about 45° to the conveyor tube. Thus when the screw conveyor is vertical the discharge outlet tube will be at an angle of about 45° to the vertical and when the screw conveyor is swung out to its maximum of about 45° from the vertical (as shown in FIG. 2) the discharge outlet tube 24 will be vertical. This outlet tube from the screw conveyor is about 2 ft 6" (75 cm) long and forms the first part of the gravity feed means for the pressure tanks.

The bottom end of the outlet tube from the screw conveyor is connected to a bellows unit 25 thereby providing a flexible sealing connection from the movable screw conveyor to a rigidly mounted gravity feed in the form of an inverted Y-shaped tube 27. The bellows unit 25 is of a flexible material and has a flange connector at the top and bottom, and has an axial length of about 1 ft 3" (35 cm) when it is in the vertical compressed state. The uppermost limb 26 of the Y-shaped connector which is joined to the bottom of the bellows unit is funnel shaped having a mouth of superficially elliptical shape being about 1 ft (30 cm) diameter along the minor axis and about 1 ft 6" (45 cm) along the major axis, the actual shape being that swept by the bottom of the first part of the gravity feed means when the screw conveyor is swung from its vertical to its sloping position. This funnel shape facilitates reception of the falling pulverulent material from any position of the screw conveyor discharge outlet. The lower limbs 28 of the Y-shaped gravity feed connector are tubular shaped of about 1 ft (30 cm) diameter circular cross-section, and each limb is very approximately of about 1 ft 9" (50 cm) length. Each of the lower tubular limbs 28 of the Y-shaped gravity feed mechanism 27 lead into a respective pressure blow tank 2. The overall vertical distance from the top of the gravity feed mechanism including the top movable tube 24, the bellows 25 and the bifurcated portion 27 is about 7 ft (210 cm). Each pressure blow tank 2 is a commercially available unit. The superficial overall shape of the tank is a vertically mounted cylinder 31 with a domed top 32 and a frusto-conical tapering base 33. The true cylinder portion 31 has a height of about 2 ft 6" (75 cm) and a diameter of about 5 ft (150 cm) the domed lid 32 being symmetrical and rising about another 9" (22 cm) at the center. The frusto-conical lower portion 33 has a height of about 2 ft 6" (75 cm) tapering from the full 5 ft (150 cm) diameter at the top to about 2 ft (65 cm) diameter at the base. Below that is a flanged convexly domed base 35 projecting about 10" (25 cm). Thus, the overall dimension of the tank is about 7 ft (210 cm) in height by about 5 ft (150 cm) diameter. The two pressure blow tanks are positioned side by side spaced about 6" (16 cm) apart with their vertical axes parallel.

Each tank has, leading into the domed top portion, an entrance tube 37 of about 1 ft (30 cm) diameter for the material coming down one limb of the bifurcated gravity feed, a discharge tube 39 of about 5" (13 cm) diameter for material to be carried away entrained in an air stream, and a displaced air tube 41 of about 4" (10 cm) diameter. The convex bottom of the tank has a valved pressurized air inlet opening (not shown) to which compressed air lines (not shown) can be connected.

The interior construction of the tanks is conventional for pressurised blow tanks and indeed the tanks are commercially available units, not modified in any way. Each of the inlets and outlets is appropriately valved. For example, the displaced air outlet and material discharge outlet can have externally located pinch valves 43 and 45.

The displaced air outlet from the tank leads via a 4" (10 cm) pinch valve 45 to an air filter bag 5 which is suspended from the framework so as to be disposed vertically above the air outlet. Superficially it takes the form of a cylinder of about 2 ft 6" (80 cm) axial length and about 8" (20 cm) diameter.

The material discharge pipe 6 from each pressure blow tank after the pinch valve is in the form of a rigid 5" (13 cm) diameter tube about 8 ft (280 cm) long. The two discharge pipes, one from each tank, are ascendant and sloped towards each other so as to meet at an inverted Y junction 47 so that they join to form a short 5" (13 cm) diameter common discharge outlet with a bell shaped end or flange connector 48 that can be quickly connected to a pipe leading away from the mobile unloader to the new receptacle for the material. The common discharge outlet is positioned so as to be near to the suspension means 50 for the whole unloader and the overall vertical height from this discharge outlet coupling to the tops of the pressure tanks is about 10 ft 8" (320 cm).

The framework for the unloader comprises a rigid but strong light-weight tubular structure in approximately tetrahedral form, with the top apex represented by the suspension means 50 for the unloader and the four base corners 52 being the corners of a rectangle formed by joining two parallel horizontal diameters of the two pressure blow tanks these diameters being taken at right angles to a horizontal line joining their respective vertical axes. Suitable strengthening struts and mounting brackets can be attached to the basic tetrahedral framework. For example, the two pressure tanks are positioned side by side by a pair of horizontal bars 54 welded or otherwise attached to their sides.

The suspension means at the top of the apparatus is suitably a bracket in the form of a pivotally mounted inverted U piece 56 and retaining pin of the conventional type for slinging equipment below cranes.

Plug means (not shown) for receiving compressed air and power, and control means (not shown) for operating the valves and maneuvering the screw conveyor are conventional units which can be attached to the framework at any convenient point between the tanks and the suspension means.

In operation, firstly the unloader is slung below a deck derrick on the bulk carrier and connected up to a suitable power source which may be from a cable running from the shore and connected to a source of compressed air which will usually be a mobile compressor unit. The discharge outlet will be connected to a flexible pipe which may lead to the shore to a hopper there, to lorries, or to barges, or whatever the next receptacle for the fluent solid material is to be.

The unloader is then lowered into the hold of the bulk carrier and set into operation. Powdered material picked up by the screw conveyor is conveyed upwardly until it reaches the gravity feed where it falls into one of the pressure blow tanks. While material is falling into the fall the air displaced from the tank is forced our through the air filter bag.

When one tank is full the material input is switched to the other tank and then compressed air is fed to the bottom of the full tank which blows the material out of the tank entrained in a stream of air. Thus, the tank discharge mechanism is a pneumatic technique. Whilst the first tank is discharging the second tank is being charged. When the first tank is empty and the second tank is full of material the valves are operated to switch the inputs and outputs. Material starts to enter the first tank again whilst the slightly pressurized air is vented through the displaced air outlet and filter unit. Meanwhile the compressed air pressurizes the second tank and blows the material out through the material discharge at the top. This sequential operation can be automatic with control initiation and stop being carried out from a suitably located unit.

Thus, the material is continuously picked up from the ship's hold and fed to one or the other of the two pressure blow tanks, and material is continuously blown out away from the unloader via the common discharge outlet down the pipe leading away from the ship.

As the ship's hold empties the unloader can be lowered further into the hold and can be swung around as much as the deck derrick permits mobility. Additional versatility allows the screw conveyor to be swung around to give access to awkward corners of the hold and pick up residual piles of the solid fluent material, as the screw conveyor is swivelled to positions offset from the centre line of the supporting cable between the derrick and the unloader.

Figure 4:
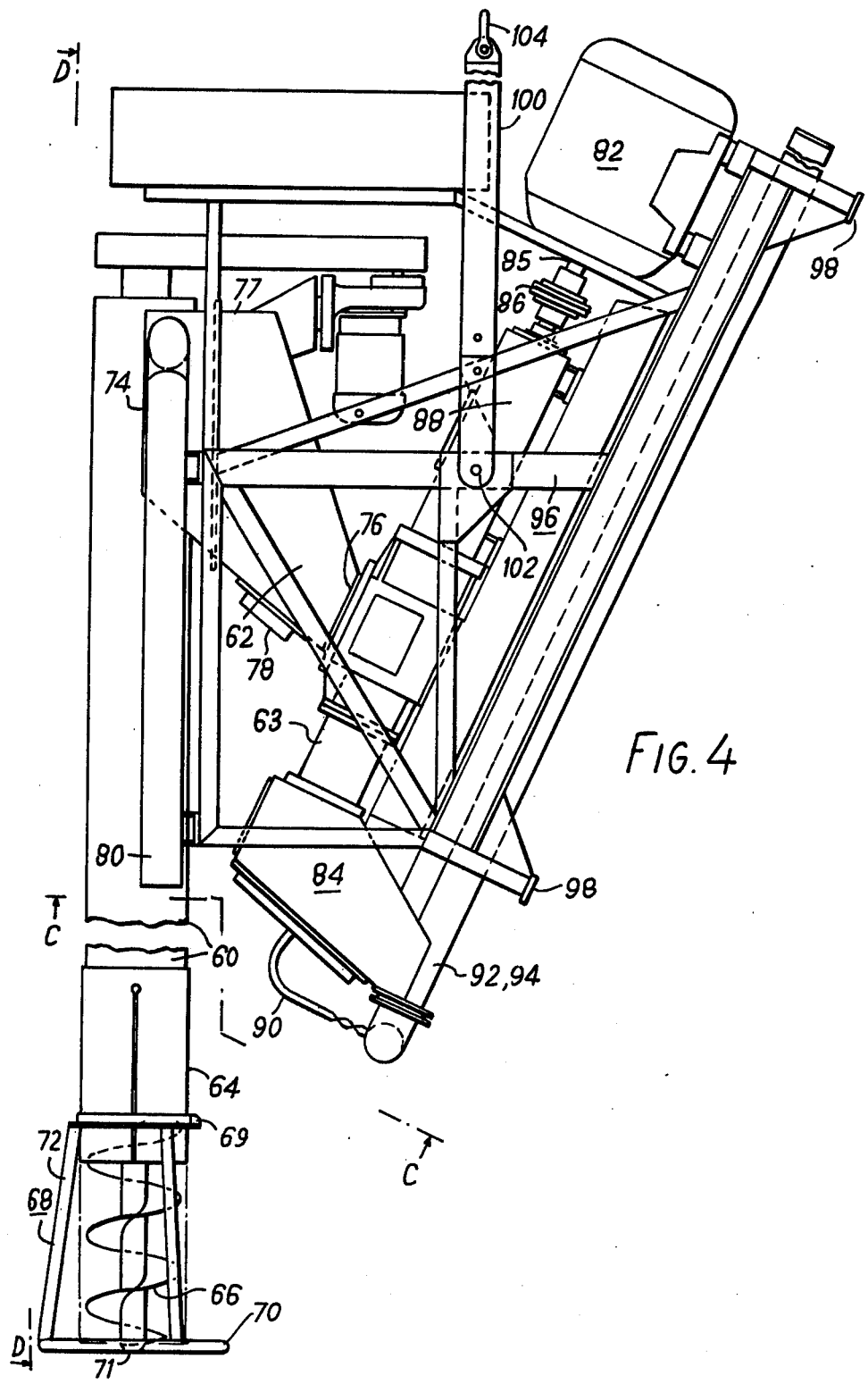
FIG. 4 is a side view of a second embodiment of the invention wherein the mechanical elevator system is a screw conveyor and the apparatus for initiating pneumatic transport includes a fluid solids pump.

In another embodiment of the mobile bulk unloader of this invention, illustrated in FIGS. 4, 5 and 6, the apparatus for initiating pneumatic transport of the material includes a fluid solids pump of the type having an impeller screw within a barrel for leading solid fluent material into an air/solid mixing chamber provided with a pressurized air inlet.

The unloader of this embodiment comprises, in general terms, a screw conveyor 60 which delivers material to a gravity feed means in the form of an enclosed chute 62 feeding into the fluid solids pump 63.

The screw conveyor 60 is similar to the one already described for the first embodiment of this invention having a straight hollow tube containing an axially mounted screw. However, to give the conveyor some extra versatility in handling different materials the lower end portion of the tube is provided with a slightly larger diameter slidably mounted external tubular end portion 64 which acts as an adjustable shroud permitting the length of the tube to be adjusted and hence the blade of the screw to be exposed to variable degree. Also, as a safety device and guard against damage of the screw and shroud in use and transit, the lower end portion of the elevator is provided with a simple shield in the form of a frusto-conical cage 68 comprising an upper steel ring 69 mounted around the outside of the tube and a lower larger diameter steel ring 70 whose center is the lowest point of the shaft 71 of the screw and this lower ring 70 is joined to the upper ring by three symmetrically disposed converging bars 72.

The top of the conveyor 60 has a material discharge outlet in the side for delivering material into an enclosed chute 62 leading down to a material inlet for the fluid solid pump 63. The screw conveyor 60, chute 62 and fluid solid pump 63 are not independently maneuverable but are fixed in relation to each other, such that with the screw conveyor tube vertical, the axis of the chute 62 is inclined downwardly at about 50° to the horizontal, and the longitudinal axis of the impeller screw of the fluid solid pump 63 is at about 25° to the vertical.

The enclosed chute 62 is of boxed form having an overall funnel shape of angular cross-section being open at the bottom and attached directly to the material inlet 76 to the fluid solids pump 63. The top of the chute is covered by a plate 77, the feed inlet to the chute being through the side immediately adjacent to the top and connected to the outlet 74 from the screw elevator. In the lower sloping wall of the chute is an opening connected to a shallow box 78 provided with a magnetic plug. This box acts as a separating means for holding back unwanted foreign bodies of magnetic material, most usually such items as iron nuts, bolts or wire, picked up by the screw conveyor.

Immediately adjacent to the output connection from the screw elevator a pair of overflow pipes 80 are connected to the tube of the elevator which are clamped to extend lengthwise against the elevator screw tube so that any excess material lifted by the elevator which cannot enter the fluid solids pump because the feed chute is full, will be returned to the hold of the bulk carrier.

The fluid solids pump is of generally cylindrical shape having in line a rotary motor 82, a barrel 63 containing an impeller screw and an air/solid mixing chamber 84, the pump being arranged with the motor uppermost. The shaft 85 from the motor 82 passes through a coupling 86 to a bearing housing 88 from where the shaft passes axially centrally through a sealing ring (internal and therefore not shown) and then axially centrally through the barrel 63. The internal construction of the pump is not shown but the barrel has an internal cylindrical form and contains the impeller screw which takes the form of a helical vane on the shaft which vane sweeps the full volume of the barrel. Towards the upper end of the barrel 63 is a circumferential opening 76 and to this is connected directly the feed chute 62 for solid material. Internally again and so not illustrated in the drawings the lower end of the barrel has an outlet provided with a valve or seal in the form of a check disc. The flight of the screw vane is of decreasing pitch from the upper end adjacent to the inlet opening to the lower end with its valve. Thus, in operation when any solid fluent material enters the barrel and is fed downwardly through it by the impeller screw it is compacted until the terminal flight of the screw urges it against the face of the check disc and it is urged through the valve to enter the air/solids mixing chamber 84. This mixing chamber or expansion chamber is of tapering form and contains internally a fluidizing pad (not shown) in the form of a flexible membrane and a series of air jets. An air line 90 supplies these jets with compressed air.

In operation, fluent solid material urged through the check valve into the expansion chamber is fluidized and then carried away entrained in a stream of pressurized air. A fixed portion 92 of pipe for pneumatic transport is mounted parallel to and underneath the fluid solids pump, and is connectable at its upper end to the discharge pipe (not shown) leading away from the unloader. Parallel to this fixed outlet pipe 92 and also mounted onto the framework below the pump is an air supply pipe 94.

The whole assembly of the screw conveyor 60, feed chute 62, fluid solids pump 63 and associated pipework and controls is mounted on a rigid angle steel framework 96. For convenience in parking the unloader when not in use, the framework below the fluid solids pump and pneumatic transport pipe is provided with corner legs 98 and acts as a support skid. A separate supporting framework 100 is pivotally mounted about a pivot pin 102 on the rigid framework and this pivotable framework 100 carries at its uppermost end a sling and shackle arrangement 104, whereby the whole unloader can be suspended from the hook of a deck derrick.

The overall operation of this embodiment of the invention is similar to that described above for the first embodiment but is continuous. Material picked up from the hold of the ship is lifted by the screw conveyor and fed to the chute from where it enters the barrel of the fluid solids pump. The pump feeds the solid material continuously into the air/solid mixing chamber and the material is fluidized and then pneumatically transported away into the discharge pipe. Although the screw conveyor is not separately maneuverable with respect to the pump and chute, the rigid framework carrying the working parts of the unloader can be maneuvered in relation to the upper pivotable framework. Thus the whole unloader can be lowered into the hold of the carrier and the inclination of the whole device can be altered by pivoting the two frameworks relatively to each other. In the illustrated form, this pivoting would need to be done by cable devices (not shown), but hydraulic rams mounted between the fixed rigid framework and the pivotable framework may be provided.

Using any embodiment of the unloader of this invention, material having been removed from the holds of the bulk carrier and conveyed through the conveyance pipe leading away from the unloader and hence away from the ship can be deposited in a new storage silo via an expansion chamber. This storage silo can be land based as a permanent, semi-permanent or mobile piece of equipment or could even be on a barge or the like. At this point separation of the material and entraining air is effected, the material being deposited in its new receptacle, and the air being exhausted to atmosphere via a suitable filter such as a bag filter unit or equivalent device.

In the case of cement, the new storage silo or hopper may then feed bagging units, road tankers, or mixer devices producing ready mixed concrete.

It will be appreciated that although the unloader is eminently suitable for use with cement powder, it can be used for any granular or pulverulent materials. For example, such materials could include minerals, metal ores, chemicals, natural products, or synthetic products in finely divided solid state, for example, alumina, bentonite, copper, flour, graphite, iron-ore, lime, plastics, pulverized coal, starch or cocoa.

The mobile bulk unloader thus avoids the necessity of providing special bases in the holds of bulk carriers or the provision of expensive and complex bulk unloading structures located on the quay, is easily re-located from site to site, and is capable of conveying materials over distances in excess of those normally regarded as limiting when discharging ships,, thereby facilitating ships to moor off-shore whilst transferring solids ashore where there are no built up quays.

It will be appreciated that superficial aspects of design of the bulk unloader can be altered without departing from the invention.

In a third embodiment (not illustrated) of the bulk unloader, having a pair of blow tanks and being a variation of the first embodiment, the air filtering equipment is omitted, the gravity feed conduit from the bellows unit is replaced by an air assisted gravity feed conveyor, the supporting framework is altered in design, and the winch for operating the movement of the screw conveyor is replaced by a motorized unit. Other minor modifications are incorporated although operations of this embodiment is essentially similar to the first embodiment.

In order to facilitate storage of the bulk unloader and its retrieval from a storage place, which may include a shore based location necessitating using the ship's deck derricks to hoist the unloader over the side of the ship, the screw conveyor is made so as to be detachable from the rest of the equipment. Thus, an easily mountable and dismountable joint is provided between the top of the screw and the framework. The heavier bulkier portion of the unloader comprising the pressure tanks, the supporting framework, the motorized units and main pipework and valves is more maneuverable because its overall height is reduced by about 5 ft (150 cm) without the screw conveyor projecting below the pressure tanks.

The pressure tanks are provided with "manholes" or access hatches in the cylindrical wall portions so that material can be removed from their interior.

Instead of having a material discharge outlet and also a displaced air outlet from each tank the same outlet can be used to serve both purposes. This necessitates having an additional valve or replacing the simple on/off valve of the discharge outlet by a two-way valve so that displaced air may be vented away during the filling of a tank. Each tank then has a single outlet leading to the valve or valves and a bifurcated conduit, one limb serving as the material discharge conduit and the other as the vented air conduit. Conveniently, the vented air conduits from each tank are joined to form a Y-shaped conduit with a single vent to atmosphere, either directly or via an air filter unit.

The inverted Y-shaped gravity feed connector between the bellows unit and the tanks is replaced by an air assisted conveyor comprising a single unit having a pair of gently sloping bases leading from a central entry duct which is also furnished with an air input. Thus, instead of material simply falling down one limb of an inverted Y-shaped gravity conduit, it slides down one limb being pushed along by air assistance. The overall height of such an air assisted conveyor is less than that of a simple gravity feed conduit permitting a slight compaction of the apparatus.

The framework of the apparatus instead of being essentially tubular sections arranged into tetrahedral form is made up of rectangular section girders making a more angular or box like shape structure. Basically however, the overall shape is still dictated by the arrangement of having the wide pressure tanks at the base suspended from a derrick hook suspension means, giving an essentially pyramidal format.

The hand or mechanically operated winch for moving the screw conveyor is replaced by a power assisted jack system which carries out the same function.

As further variations which can be incorporated in the unloader, the design of the apparatus for initiating pneumatic transport of the material can be modified. For example, a rotary air lock feeder could be used or the type of impeller screw fluid solids pump could be one of positive-displacement progressive-cavity system, wherein a solid rotor of generally helical form moving within an elastomeric stator having internal helical threads replaces the vaned shaft in a cylindrical barrel.

Auxiliary means can be provided for facilitating the picking up of material from the carrier's holds. For example, a contra-rotating external screw on the tube of the screw conveyor can be used to feed solid material downwardly towards the exposed portion of the pick up screw.

Other separating means can be incorporated into the feed means between the mechanical elevator system and pneumatics apparatus such as filter grids and gauzes.

The whole unloader can be arranged to be mountable on readily movable carriage structures, instead of on skids.

I claim:

1. An unloader for removing finely divided solid fluent material from a hold or a bulk carrier comprising a framework adapted to be suspended from a suitable support, a conveyor having its upper end portion pivotally mounted upon said framework, means carried by said framework and connected to the upper portion of said conveyor for moving the lower end of said conveyor over the material in the hold of the bulk carrier, a pair of valved pressure blow tanks connected to said framework at a point remote from the conveyor connection, said conveyor having a depending discharge outlet tube at its upper end with said tube having means for connecting same to said blow tanks for delivering material thereto, said tanks having discharge pipes terminating in a common discharge conduit.

2. An unloader as set forth in claim 1 wherein said conveyor includes a screw element positioned within a tubular member open at its lower end.

3. An unloader as set forth in claim 2 wherein said tubular member is provided at its lower end with a slidably mounted shroud for varying the length of the conveyor and the amount of the screw element exposed to the material in the hold.

4. An unloader as set forth in claim 3 wherein the lower end of said tubular member is provided with a cage to protect any portion of the screw element projecting from said tubular member.

5. An unloader as set forth in claim 1 wherein said tanks have valve inlets for receiving material from said discharge outlet tube, said tanks having valved inlets for receiving pressurized air and valved outlets for conveying material from said tanks in a stream of pressurized air.

6. An unloader as set forth in claim 5 wherein said valved inlets and outlets are interconnected and arranged for sequential operation whereby one tank can receive material while the other tank is discharging material entrained in a stream of pressurized air.

7. An unloader as set forth in claim 1 wherein the material delivered to said tanks by said discharge outlet tube is by gravity feed.

8. An unloader as set forth in claim 1 wherein said discharge outlet tube is provided with a separating means for retaining unwanted nonfluent foreign bodies picked up by said conveyor.

9. An unloader as set forth in claim 8 wherein said separating means includes a magnetic separator.

10. An unloader as set forth in claim 1 wherein said conveyor is provided with driving means for adjusting the material output rate of said conveyor to said discharge outlet tube to a rate acceptable as an input rate to said blow tanks and the subsequent discharge of said material under super atmospheric pressure from said tanks.

11. An unloader as set forth in claim 10 wherein said driving means includes a variable speed drive unit.

12. An unloader as set forth in claim 10 wherein said conveyor is provided with an overflow pipe for returning excess material to the hold of the bulk carrier.

* * * * *